US012252243B2

United States Patent
Ishitsuka et al.

(10) Patent No.: US 12,252,243 B2
(45) Date of Patent: Mar. 18, 2025

(54) AIRCRAFT

(71) Applicant: HONDA MOTOR CO., LTD., Tokyo (JP)

(72) Inventors: Yuji Ishitsuka, Wako (JP); Kazuma Yoshii, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/257,162

(22) PCT Filed: Dec. 15, 2020

(86) PCT No.: PCT/JP2020/046756
§ 371 (c)(1),
(2) Date: Jun. 13, 2023

(87) PCT Pub. No.: WO2022/130501
PCT Pub. Date: Jun. 23, 2022

(65) Prior Publication Data
US 2024/0034466 A1 Feb. 1, 2024

(51) Int. Cl.
*B64C 29/00* (2006.01)
*B64U 10/20* (2023.01)

(52) U.S. Cl.
CPC .......... *B64C 29/0025* (2013.01); *B64U 10/20* (2023.01)

(58) Field of Classification Search
CPC . B64C 29/0008; B64C 29/0025; B64C 39/08; B64C 39/12
See application file for complete search history.

(56) References Cited

U.S. PATENT DOCUMENTS

| | | | |
|---|---|---|---|
| 4,500,055 A * | 2/1985 | Krojer | B64D 27/14 244/65 |
| 5,407,150 A | 4/1995 | Sadleir | |
| 5,957,405 A * | 9/1999 | Williams | B64D 33/02 244/54 |
| 6,270,038 B1 | 8/2001 | Cycon et al. | |
| 6,467,726 B1 | 10/2002 | Hosoda | |
| 10,633,101 B2 * | 4/2020 | Negulescu | B64D 27/20 |
| 2013/0112804 A1 * | 5/2013 | Zhu | B64C 29/0033 244/2 |
| 2018/0354613 A1 * | 12/2018 | Cvrlje | B64D 27/24 |
| 2019/0127061 A1 | 5/2019 | McLaren et al. | |
| 2020/0115045 A1 * | 4/2020 | Mermoz | B64C 29/0033 |

(Continued)

FOREIGN PATENT DOCUMENTS

| | | |
|---|---|---|
| JP | 07-040897 A | 2/1995 |
| JP | 2001-071998 A | 3/2001 |

(Continued)

OTHER PUBLICATIONS

International Search Report, International Application No. PCT/JP2020/046756, Date of mailing: Feb. 16, 2021, 2 pages.

*Primary Examiner* — Richard G Davis
(74) *Attorney, Agent, or Firm* — Rankin, Hill & Clark LLP

(57) ABSTRACT

In a front view of this aircraft, there is an over-lap portion where at least a part of a fuselage and at least a part of two cruising rotors overlap, and a rear portion of the fuselage has an inclined surface which is displaced downward from upward progressing from the front to the rear, such that the area of the overlap portion gradually becomes smaller progressing from the front to the rear.

8 Claims, 7 Drawing Sheets

(56) References Cited

U.S. PATENT DOCUMENTS

| | | | | |
|---|---|---|---|---|
| 2020/0247536 A1* | 8/2020 | Mokhtarian | ........... | B64U 10/20 |
| 2020/0333779 A1 | 10/2020 | Regev | | |
| 2021/0245874 A1* | 8/2021 | Evulet | .................... | B64D 27/14 |
| 2022/0081107 A1* | 3/2022 | Merdinger | .............. | B64C 27/10 |
| 2022/0411087 A1* | 12/2022 | Tian | ........................ | B64C 27/30 |
| 2023/0382525 A1* | 11/2023 | Kazakli | ............... | B64C 29/0025 |

FOREIGN PATENT DOCUMENTS

| | | |
|---|---|---|
| JP | 2002-542116 A | 12/2002 |
| JP | 2020-526436 A | 8/2020 |

\* cited by examiner

AIRCRAFT

TECHNICAL FIELD

The present invention relates to an aircraft capable of taking off and landing in a vertical direction and of cruising.

BACKGROUND ART

US 2020/0115045 A1 discloses an aircraft referred to as a vertical take-off and landing (VTOL) aircraft. The aircraft disclosed in US 2020/0115045 A1 includes a fuselage, a front wing and a rear wing (main wing) connected to the fuselage, a plurality of takeoff and landing rotors disposed on the left and right sides of the fuselage, and a plurality of cruise rotors disposed above the rear wing. This aircraft uses the takeoff and landing rotors during takeoff and landing and during hovering, and uses the cruise rotors during cruising. In addition, this aircraft uses both the takeoff and landing rotors and the cruise rotors when transitioning from hovering to cruising and when transitioning from cruising to hovering.

SUMMARY OF THE INVENTION

Disposing a thrust device at the upper portion of the wing has disadvantages in aerodynamic design. For this reason, it is preferable to dispose the thrust device at the lower portion of the wing. However, in the aircraft disclosed in US 2020/0115045 A1, if the thrust device is disposed at the lower portion of the rear wing, the following problem may occur.

In the aircraft disclosed in US 2020/0115045 A1, the takeoff and landing rotors are disposed forward of the cruise rotors in plan view. A pair of takeoff and landing rotors disposed forward of the cruise rotors cause air to flow downward. The air generated at this time interferes with the air guided from the front to the cruise rotors. Then, there is a possibility that disturbance occurs in the flow of the air guided to the cruise rotors and the thrust generated by the cruise rotors is affected.

On the other hand, if the cruise rotors are disposed on the fuselage side, the fuselage is positioned forward of the cruise rotors. Then, the fuselage may obstruct the flow of the air guided to the cruise rotors. In this case, sufficient thrust cannot be generated by the cruise rotors.

The present invention has been made in view of such a problem, and an object thereof is to provide an aircraft capable of sufficiently obtaining thrust generated by cruise rotors.

According to an aspect of the present invention, there is provided an aircraft comprising: a fuselage; a wing connected to an upper portion of a rear portion of the fuselage; and at least two cruise rotors disposed on right and left sides of a central axis of the fuselage, and configured to generate thrust when the aircraft moves in a horizontal direction, wherein at least a portion of the fuselage and at least a portion of each of two cruise rotors among the at least two cruise rotors overlap each other in a front view of the aircraft to form an overlapping portion, and the rear portion of the fuselage includes an inclined surface that is inclined downward in a direction from front to rear, in a manner so that an area of the overlapping portion gradually decreases from the front toward the rear.

According to the present invention, it is possible to sufficiently obtain the thrust generated by the cruise rotors.

DETAILED DESCRIPTION OF THE INVENTION

A preferred embodiment of an aircraft according to the present invention will be presented and described in detail below with reference to the accompanying drawings.

1. Overall Configuration of Aircraft 10

In the present embodiment, an aircraft 10 is assumed to be an electric vertical take-off and landing (eVTOL) aircraft that generates lift and thrust using rotors each including an electric motor. In this specification, a vertically upward direction is referred to as an upward direction (upward), and a vertically downward direction is referred to as a downward direction (downward). Further, a moving direction of the aircraft 10 when the aircraft 10 moves (flies) in the horizontal direction is referred to as a forward direction (forward), and a direction opposite thereto is referred to as a rearward direction (rearward). Further, in a state of facing forward from the aircraft 10, a direction toward the right side in the width direction of the aircraft 10 is referred to as a right direction (rightward), and a direction toward the left side in the width direction is referred to as a left direction (leftward). Further, the plan view of the aircraft 10 refers to a view in which the respective components are viewed from a position directly above the aircraft 10. The front view of the aircraft 10 refers to a view in which the respective components are viewed from a position in front of the aircraft 10.

Figure 1:
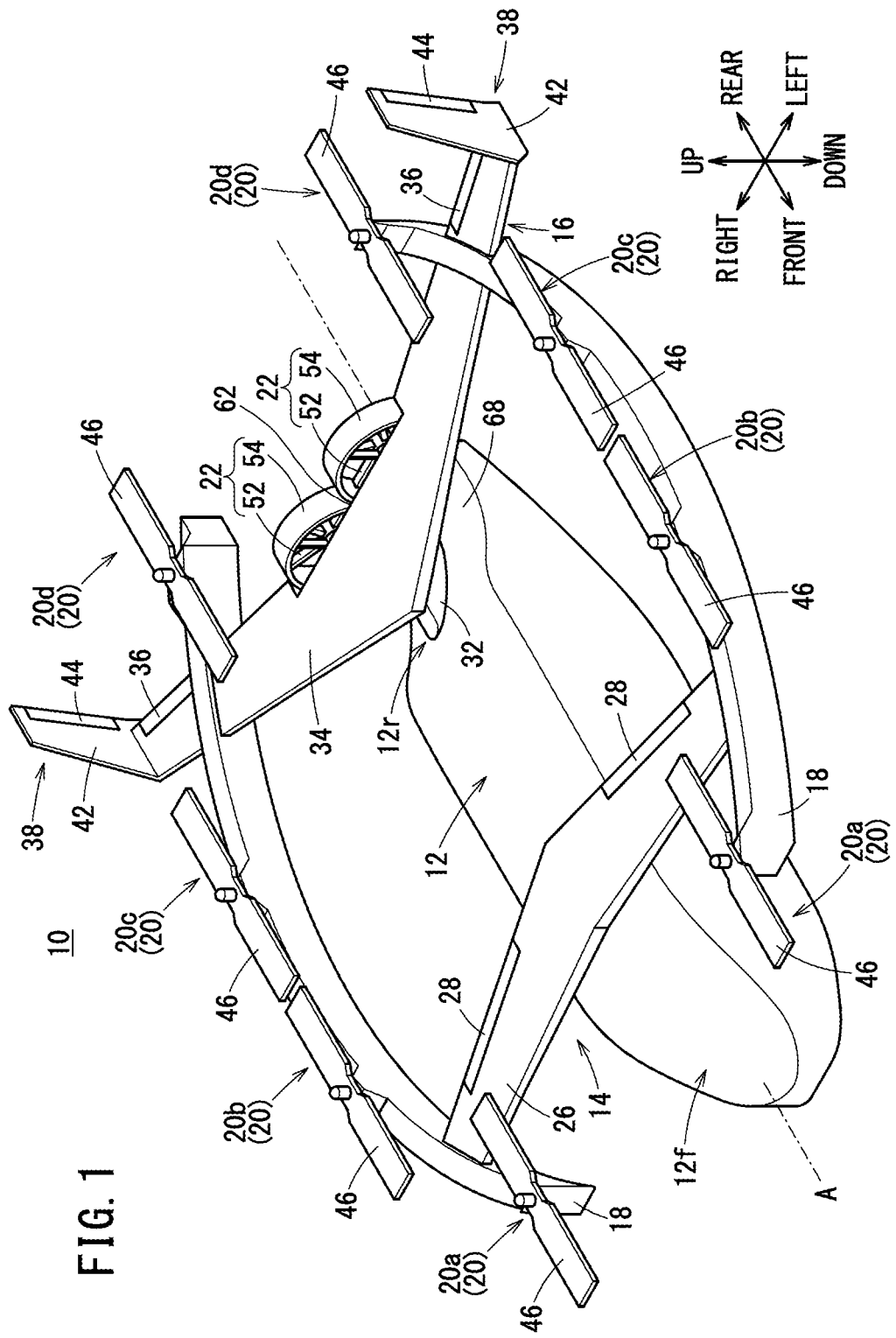
FIG. 1 is a perspective view of an aircraft according to a present embodiment.
Figure 2:
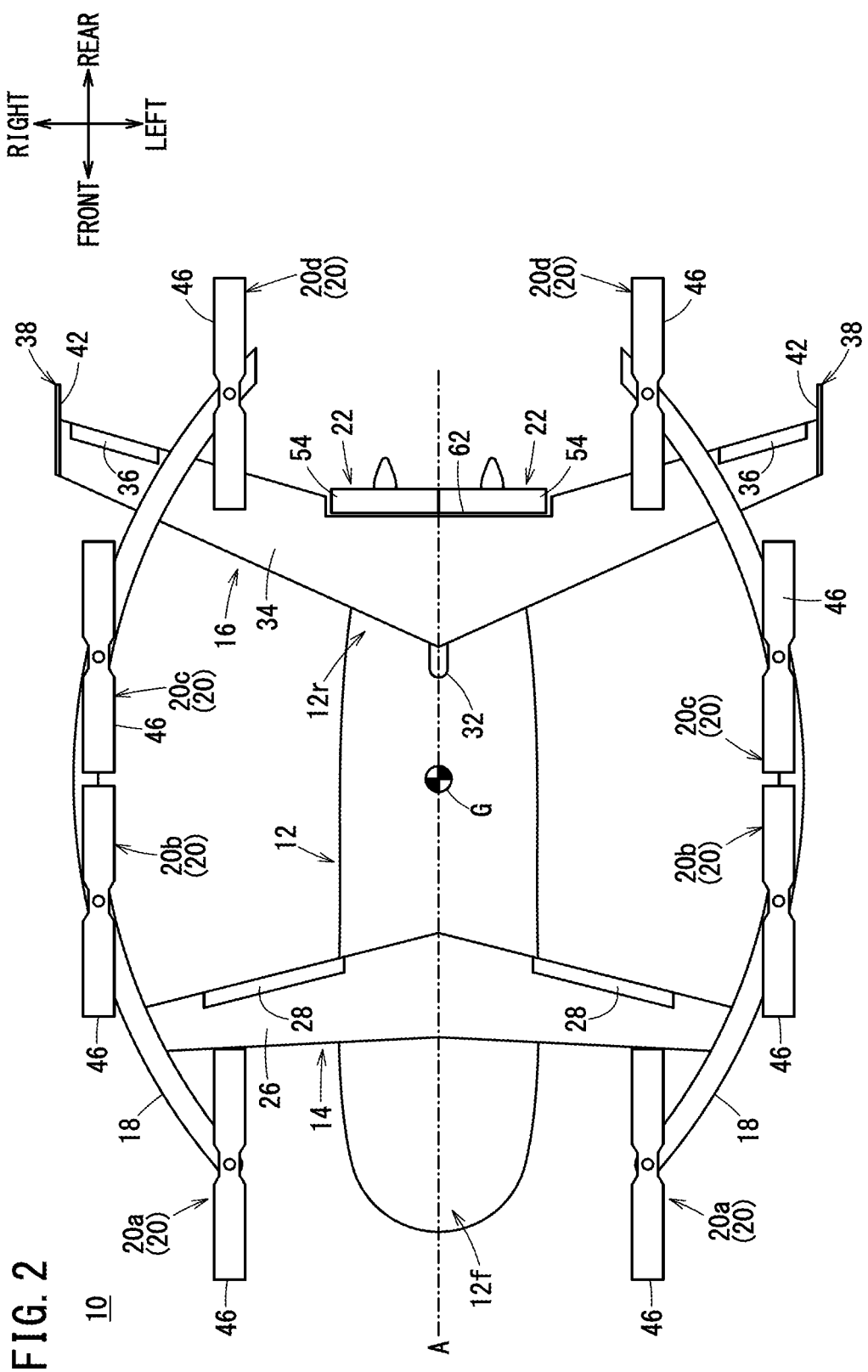
FIG. 2 is a plan view of the aircraft according to the present embodiment.
Figure 3:
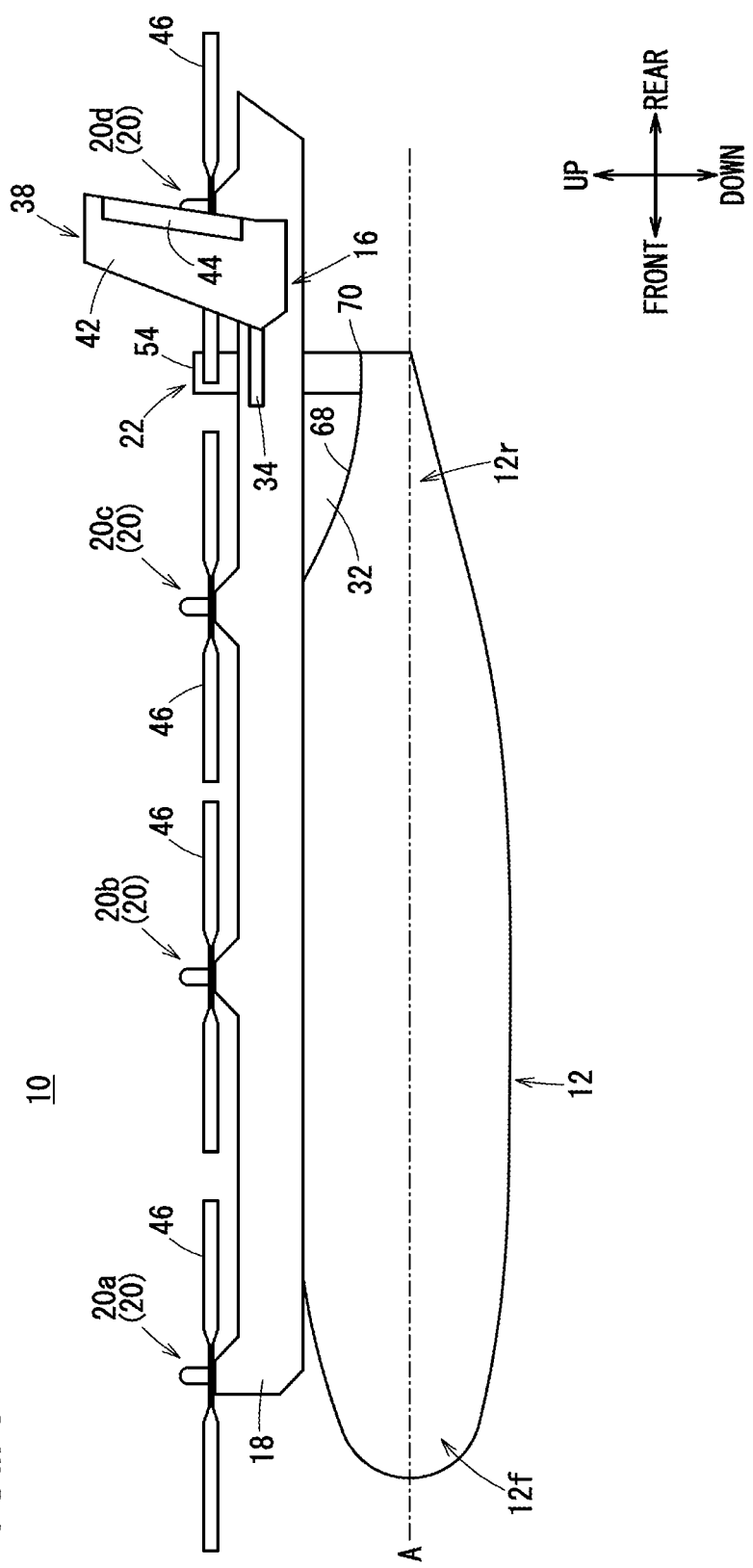
FIG. 3 is a left side view of the aircraft according to the present embodiment.

The aircraft 10 includes a fuselage 12, a front wing 14, a rear wing 16, two booms 18, eight takeoff and landing rotors 20, and two cruise rotors 22. As shown in FIG. 2, the structure of the aircraft 10 in plan view is bilaterally symmetrical about a position overlapping a central axis A of the fuselage 12 extending in the front-rear direction. In plan view, the central axis A overlaps a center of gravity G of the aircraft 10.

The fuselage 12 is long in the front-rear direction. The fuselage 12 includes a front portion 12f located forward of the center of gravity G, and a rear portion 12r located rearward of the center of gravity G. The front portion 12f is configured such that the front end thereof is narrow. The rear portion 12r is configured such that the rear end thereof is narrow. The main body of the fuselage 12 may be partially covered with a fairing. In this specification, the fuselage 12, the front portion 12f, and the rear portion 12r are referred to as such, including the fairing.

The front wing 14 is connected to an upper portion of the front portion 12f of the fuselage 12 and is configured to generate lift when the aircraft 10 moves forward. The front wing 14 includes a front wing main body (also referred to as a horizontal stabilizer) 26 extending to the left and right (laterally) from the center, and left and right elevators 28 disposed at the trailing edge of the front wing 14.

The rear wing 16 is connected to an upper portion of the rear portion 12r of the fuselage 12 via a pylon 32 and is configured to generate lift when the aircraft 10 moves forward. The rear wing 16 includes a rear wing main body 34 extending laterally rearward from the center, left and right elevons 36 disposed at the trailing edge of the rear wing 16, and a pair of vertical tails 38 disposed at left and right wing tips of the rear wing 16. Each vertical tail 38 includes a tail main body 42 (also referred to as a vertical stabilizer), and a rudder 44 disposed at the trailing edge of the vertical tail 38.

The wing area of the rear wing 16 is larger than the wing area of the front wing 14. Further, the wing width of the rear wing 16 is greater than the wing width of the front wing 14. With such a configuration, when the aircraft 10 moves forward, the lift generated by the rear wing 16 is larger than the lift generated by the front wing 14. That is, the rear wing 16 functions as a main wing of the aircraft 10. The rear wing 16 is a swept wing that reduces air resistance. On the other hand, the front wing 14 functions as a canard of the aircraft 10. The front wing 14 and the rear wing 16 also function as support members for supporting the two booms 18.

Note that the lift generated by the rear wing 16 when the aircraft 10 moves forward and the lift generated by the front wing 14 when the aircraft 10 moves forward may be substantially the same. The magnitude relationship between the lift generated by the front wing 14 and the lift generated by the rear wing 16 is appropriately determined depending on the position of the center of gravity G, the attitude of the fuselage during cruising, and the like. Further, the size (the wing area, the length, and the like) of each of the front wing 14 and the rear wing 16 is determined so as to generate a desired lift.

The two booms 18 include a right boom 18 disposed on the right side of the fuselage 12, and a left boom 18 disposed on the left side of the fuselage 12. The two booms 18 form a pair and are arranged so as to be bilaterally symmetrical about a position overlapping the central axis A of the fuselage 12 in plan view. The two booms 18 function as support members for supporting the takeoff and landing rotors 20.

The right boom 18 is a bar member that extends from the front toward the rear and is curved rightward (outward in the width direction) in an arc shape. The right boom 18 is connected to the right wing tip of the front wing 14 and is connected to the right wing of the rear wing 16 on the inner side of the elevon 36. The front end of the right boom 18 is located forward of the front wing 14. The rear end of the right boom 18 is located rearward of the rear wing 16.

The left boom 18 is a bar member that extends from the front toward the rear and is curved leftward (outward in the width direction) in an arc shape. The left boom 18 is connected to the left wing tip of the front wing 14 and is connected to the left wing of the rear wing 16 on the inner side of the elevon 36. The front end of the left boom 18 is located forward of the front wing 14. The rear end of the left boom 18 is located rearward of the rear wing 16.

The takeoff and landing rotors 20 each include a rotating mast (not shown) connected to an output shaft of an electric motor (not shown), and a propeller 46 attached to the rotating mast. The rotating mast is disposed so as to be parallel to the up-down direction and is rotatable about an axis extending in the up-down direction. The propeller 46 is located above the boom 18, the front wing 14, and the rear wing 16. With such a structure, the propeller 46 is rotatable about an axis extending in the up-down direction. Each takeoff and landing rotor 20 generates lift by rotation of the propeller 46.

The eight takeoff and landing rotors 20 include four takeoff and landing rotors 20a to 20d disposed on the right side of the fuselage 12, and four takeoff and landing rotors 20a to 20d disposed on the left side of the fuselage 12. The right-side takeoff and landing rotors 20a to 20d are supported by the right boom 18. The left-side takeoff and landing rotors 20a to 20d are supported by the left boom 18. Each of the right-side takeoff and landing rotors 20a to 20d and each of the left-side takeoff and landing rotors 20a to 20d form a pair, the position of each right-side takeoff and landing rotor and the position of the left-side takeoff and landing rotor paired with this right-side takeoff and landing rotor being the same in the front-rear direction.

As shown in FIG. 2, the pair of takeoff and landing rotors 20a, the front wing 14, the pair of takeoff and landing rotors 20b, the pair of takeoff and landing rotors 20c, the rear wing 16, and the pair of takeoff and landing rotors 20d are arranged in this order from the front toward the rear in plan view. In other words, the pair of takeoff and landing rotors 20a are disposed forward of the front wing 14. Further, the pair of takeoff and landing rotors 20b are disposed between the front wing 14 and the rear wing 16, and are disposed forward of the pair of takeoff and landing rotors 20c. Furthermore, the pair of takeoff and landing rotors 20c are disposed between the front wing 14 and the rear wing 16, and are disposed rearward of the pair of takeoff and landing rotors 20b. The pair of takeoff and landing rotors 20d are disposed rearward of the rear wing 16.

The two cruise rotors 22 are disposed on the rear portion 12r of the fuselage 12. The position of each cruise rotor 22 in the left-right direction is on the inner side (the fuselage 12 side) of the position of each pair of takeoff and landing rotors 20 in the left-right direction. Further, the position of each cruise rotor 22 in the front-rear direction is between the pair of takeoff and landing rotors 20c and the pair of takeoff and landing rotors 20d. Furthermore, the position of the axis of each cruise rotor 22 in the up-down direction is lower than the position of the propeller 46 of each takeoff and landing rotor 20 in the up-down direction.

Figure 5:
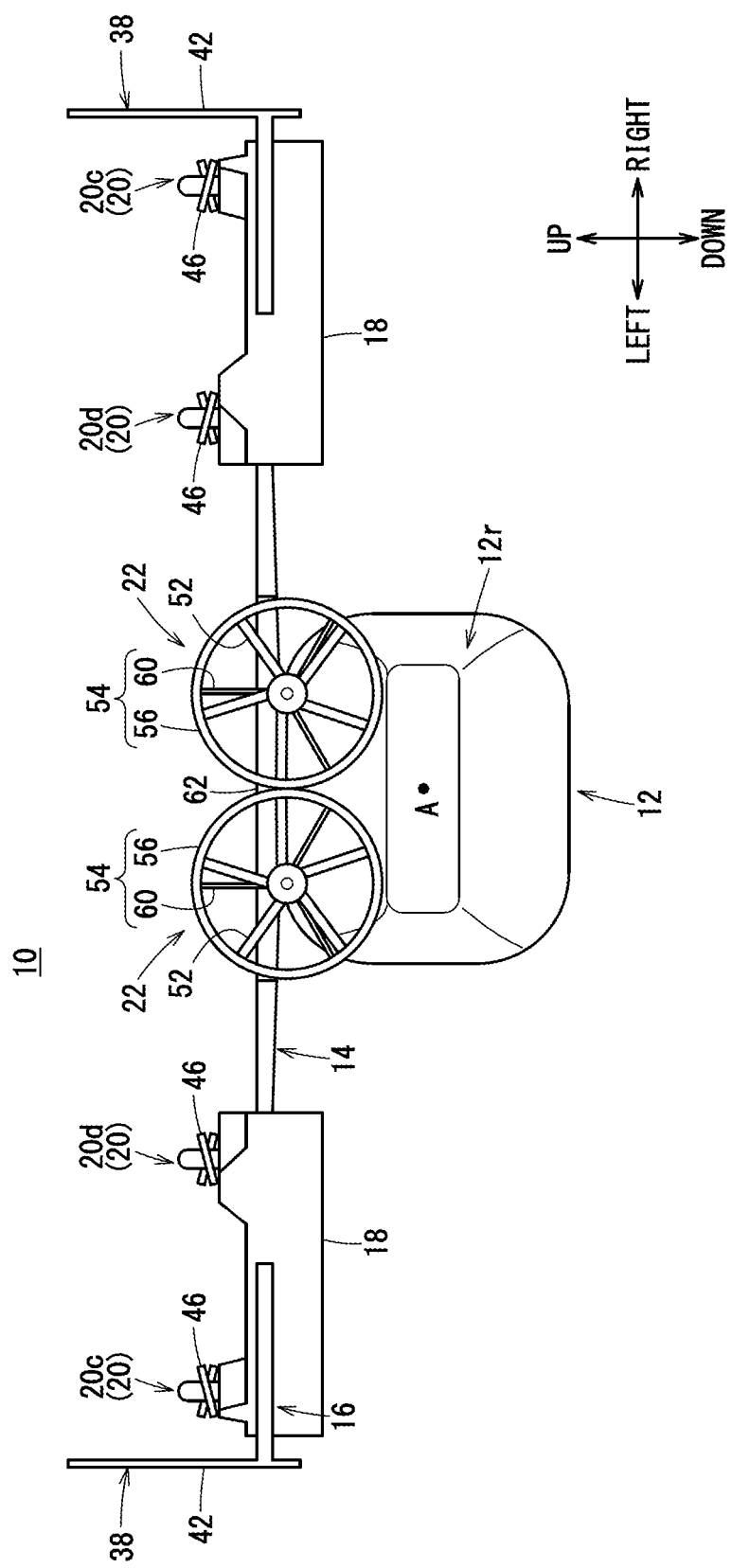
FIG. 5 is a rear view of the aircraft according to the present embodiment.
Figure 6:
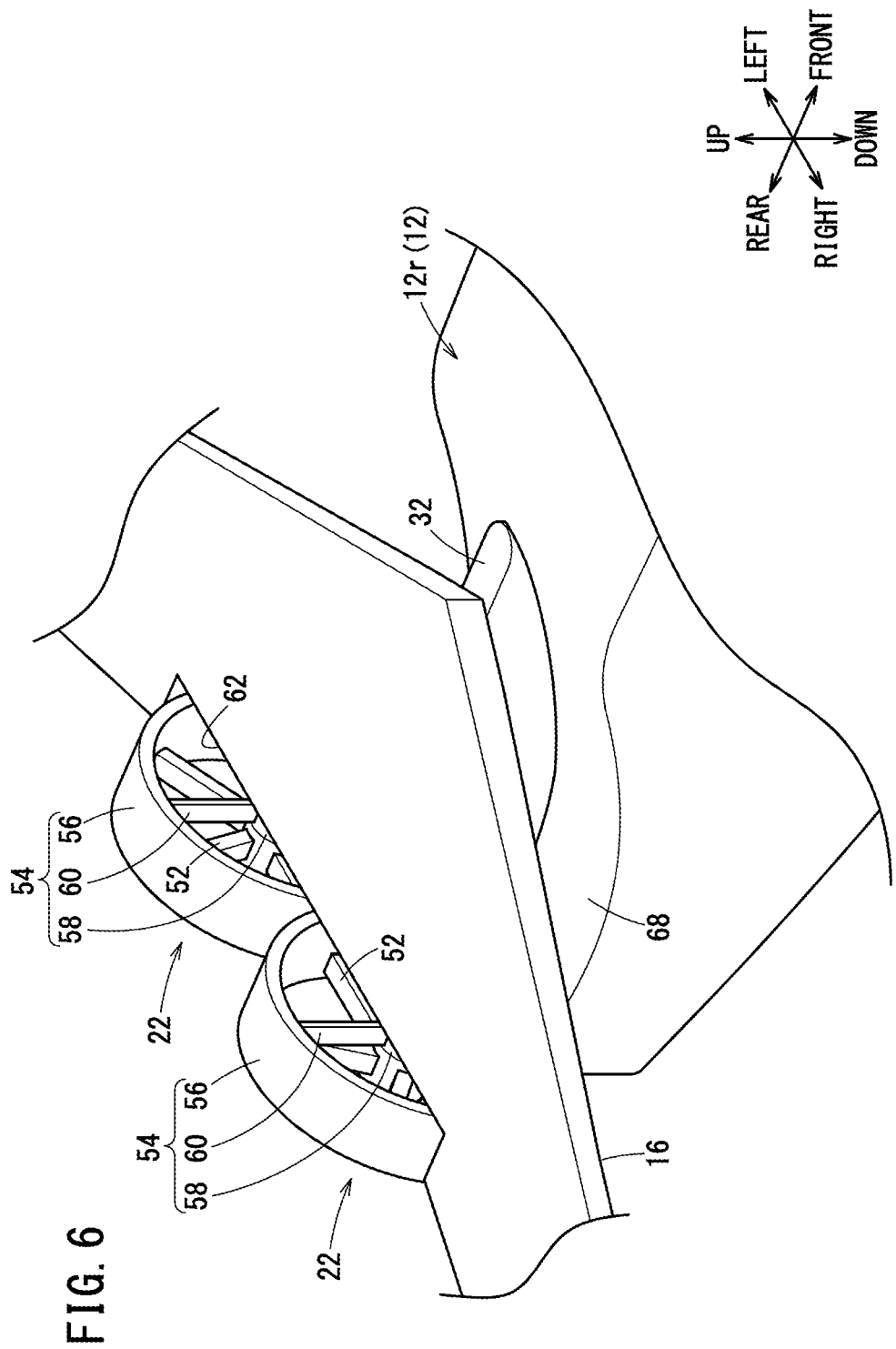
FIG. 6 is a perspective view of a periphery of a rear portion of a fuselage when viewed obliquely from above.
Figure 7:
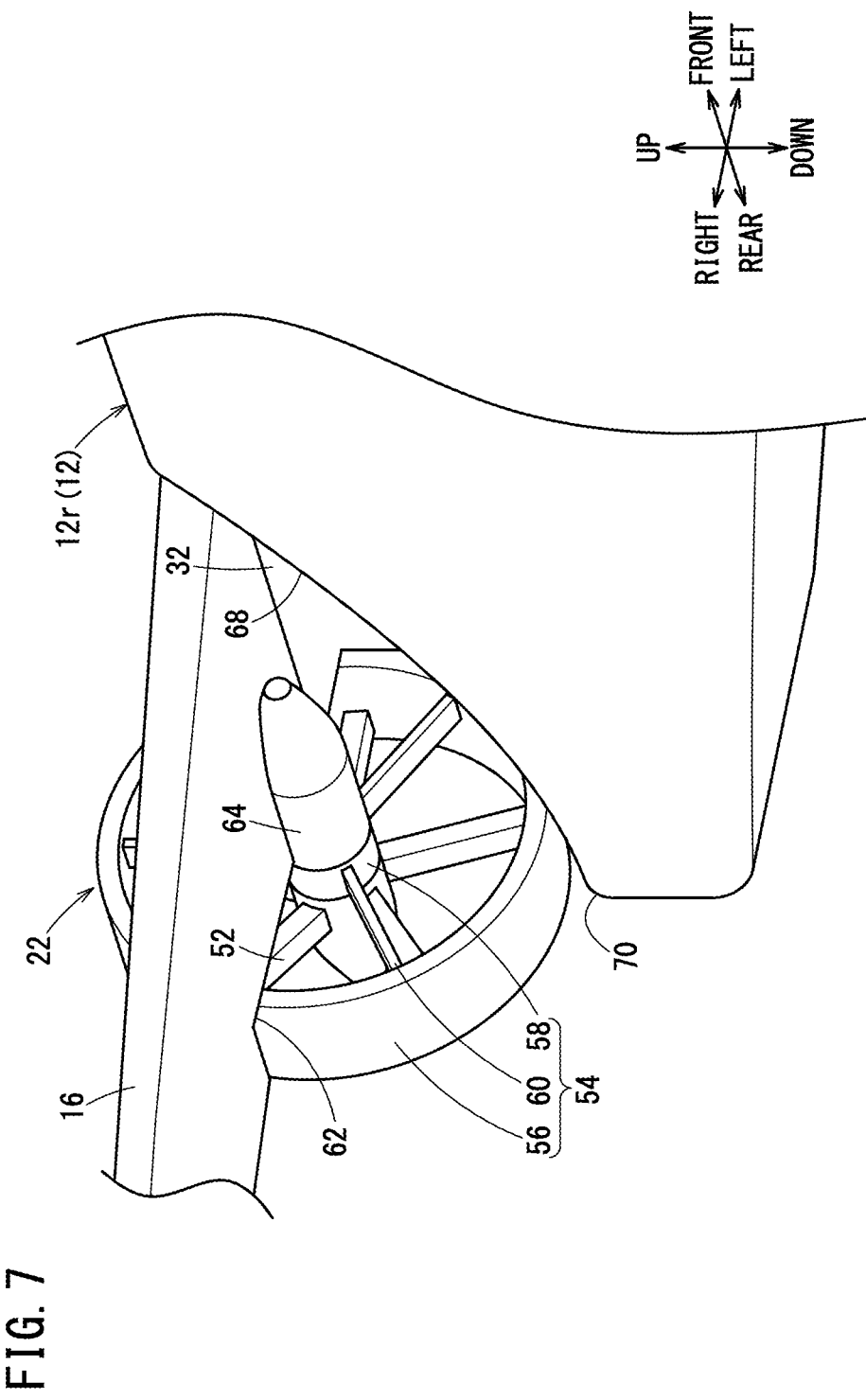
FIG. 7 is a perspective view of the periphery of the rear portion of the fuselage when viewed obliquely from below.

As shown in FIGS. 5 to 7, the cruise rotors 22 each include a rotating mast (not shown) connected to an output shaft of an electric motor (not shown), a propeller 52 attached to a front end portion of the rotating mast, and a cylindrical duct 54 surrounding the propeller 52. The positions of the two cruise rotors 22 coincide with each other in both the front-rear direction and the up-down direction. Further, the two cruise rotors 22 are arranged side by side in the left-right direction. One of the cruise rotors 22 is disposed on the right side of a position overlapping the central axis A of the fuselage 12 in plan view, and is supported by the right wing of the rear wing 16. The other cruise rotor 22 is disposed on the left side of the position overlapping the central axis A of the fuselage 12 in plan view, and is supported by the left wing of the rear wing 16. The rotating mast is located below the rear wing 16 so as to be parallel to the front-rear direction, and is rotatable about an axis extending in the front-rear direction. With such a structure, the propeller 52 is rotatable about an axis extending in the front-rear direction. Each cruise rotor 22 generates thrust by rotation of the propeller 52.

The ducts 54 each include a tubular portion 56 located on the outer side, a central portion 58 located on the center side, and a plurality of (three in the present embodiment) arms 60 extending in the radial direction of the duct 54 between the inner circumferential surface of the tubular portion 56 and the outer circumferential surface of the central portion 58. The outer circumferential surface of the left tubular portion 56 and the outer circumferential surface of the right tubular portion 56 are connected to each other. The tubular portion 56 has a cylindrical shape centered on the rotating mast, and surrounds the propeller 52. A recessed portion 62 extending in the front-rear direction, the left-right direction, and the up-down direction is formed in a portion rearward of the rear wing 16 and between the left and right elevons 36 and the left and right booms 18. The tubular portions 56 of the ducts 54 are disposed inside the recessed portion 62. However, the tubular portions 56 are separated from the recessed portion 62. As shown in FIG. 7, a protruding portion 64 that protrudes downward is formed in each of a lower portion of the left wing of the rear wing 16 and a lower portion of the right wing of the rear wing 16. The central portion 58 of the duct 54 is connected to the protruding portion 64.

Figure 4:
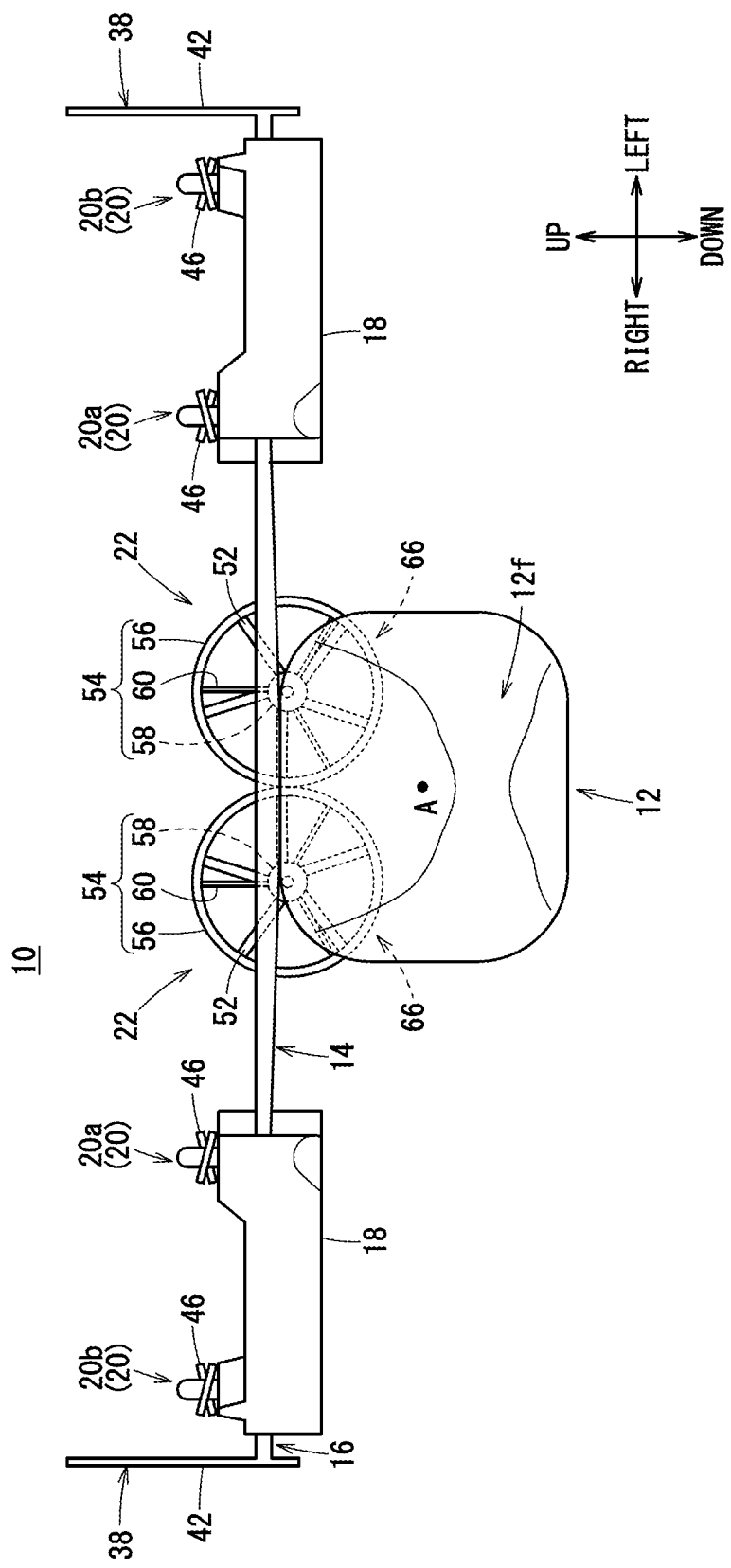
FIG. 4 is a front view of the aircraft according to the present embodiment.

As shown in FIG. 4, in front view, a portion of the rear wing 16 overlaps a portion of each cruise rotor 22. Further, in front view, an upper portion of each cruise rotor 22 protrudes above the rear wing 16, and a central portion and a lower portion of each cruise rotor 22 protrude below the rear wing 16.

Here, a positional relationship between the rear portion 12r of the fuselage 12 and the cruise rotors 22 will be described. As shown in FIG. 4, in front view, at least a portion of the fuselage 12 overlaps at least a portion of each of the two cruise rotors 22. The portions where the fuselage 12 and the two cruise rotors 22 overlap each other in front view are referred to as overlapping portions 66.

As shown in FIGS. 6 and 7, the rear portion 12r includes inclined surfaces 68 inclined downward in a direction from the front to the rear, so that the areas of the overlapping portions 66 gradually decrease from the front toward the rear. The inclined surfaces 68 extend from the front side to the rear side and from the upper side to the lower side. The inclined surfaces 68 are formed at the upper right and upper left portions of the rear portion 12r with respect to the pylon 32. The inclined surfaces 68 guide a part of the air flowing from the front to the rear above the fuselage 12, to the cruise rotors 22.

Each of the inclined surfaces 68 may be a flat surface or a curved surface. For example, in a cross section parallel to the front-rear direction and the up-down direction, the shape of the inclined surface 68 may be linear or may be curved downward. Further, in a cross section parallel to the left-right direction and the up-down direction, the shape of the inclined surface 68 may be linear or may be curved downward. If the inclined surface 68 is curved, it is preferable that the outer peripheral surface of the pylon 32 and the inclined surface 68 form a continuously curved shape in the cross section parallel to the left-right direction and the up-down direction.

The position of a rear end 70 of the inclined surface 68 in the up-down direction is lower than the position of the cruise rotor 22 in the up-down direction. On the other hand, the position of the rear end 70 of the inclined surface 68 in the front-rear direction is preferably rearward of or the same as the position of the cruise rotor 22 in the front-rear direction. However, the position of the rear end 70 of the inclined surface 68 in the front-rear direction may be forward of the position of the cruise rotor 22 in the front-rear direction. With this structure, a space without a shield is formed at a position immediately in front of the duct 54.

As shown in FIGS. 3 and 5 to 7, in the present embodiment, the lower surface of the rear portion 12r of the fuselage 12 is inclined upward in a direction from the front to the rear. Therefore, the area of the cross section of the rear portion 12r of the fuselage 12 that is parallel to the left-right direction and the up-down direction gradually decreases from the front toward the rear. However, the lower surface of the rear portion 12r, together with the inclined surface 68, may be inclined downward in the direction from the front to the rear, or may extend horizontally from the front to the rear.

2. Relationship Between Flight State and Rotor Used

The takeoff and landing rotors 20 are used when the aircraft 10 takes off, lands, and hovers. On the other hand, the cruise rotors 22 are used when the aircraft 10 is cruising. Further, the takeoff and landing rotors 20 and the cruise rotors 22 are used together when the aircraft 10 transitions from hovering to cruising and moves forward at a first speed (≥0 km/h) or more and less than a second speed (>first speed). In this case, the usage rate of the cruise rotors 22 is gradually increased for acceleration. Since the lift generated by the wing increases with acceleration, the usage rate of the takeoff and landing rotors 20 is gradually decreased. For example, the usage rate of the takeoff and landing rotors 20 is decreased by decreasing the rotational speed of the takeoff and landing rotors 20 to reduce the lift. Alternatively, the usage rate of the takeoff and landing rotors 20 is decreased by changing the pitch angle of respective blades to reduce the lift.

In addition, the takeoff and landing rotors 20 and the cruise rotors 22 are used together when the aircraft 10 transitions from cruising to hovering and moves forward at a third speed (≥0 km/h) or more and less than a fourth speed (>third speed). In this case, the usage rate of the cruise rotors 22 is gradually decreased for deceleration. Since the lift generated by the wing decreases with deceleration, the usage rate of the takeoff and landing rotors 20 is gradually increased. For example, the usage rate of the takeoff and landing rotors 20 is increased by increasing the rotational speed of the takeoff and landing rotors 20 to increase the lift. Alternatively, the usage rate of the takeoff and landing rotors 20 is increased by changing the pitch angle of respective blades to increase the lift.

3. Technical Idea Obtained from Embodiment

The technical idea that can be grasped from the above embodiment will be described below.

According to the aspect of the present invention, provided is the aircraft 10 including: the fuselage 12; the wing (the rear wing 16) connected to the upper portion of the rear portion 12r of the fuselage 12; and at least two cruise rotors 22 disposed on the right and left sides of the central axis A of the fuselage 12, and configured to generate thrust when the aircraft moves in the horizontal direction, wherein at least a portion of the fuselage 12 and at least a portion of each of the two cruise rotors 22 overlap each other in the front view of the aircraft 10 to form the overlapping portion 66, and the rear portion 12r of the fuselage 12 includes the inclined surface 68 that is inclined downward in the direction from the front to the rear, in a manner so that the area of the overlapping portion 66 gradually decreases from the front toward the rear.

In the above configuration, the fuselage 12 and the two cruise rotors 22 overlap each other in front view. That is, the two cruise rotors 22 are located close to the fuselage 12 side. Further, in the above configuration, the inclined surfaces 68 are formed on the rear portion 12r of the fuselage 12. Since a space is formed immediately in front of the cruise rotors 22 by the inclined surfaces 68, the rear portion 12r of the fuselage 12 does not obstruct the flow of the air guided to the cruise rotors 22. Further, the inclined surfaces 68 smoothly guide the air flowing from the front to the rear around the upper side of the fuselage 12, to the cruise rotors 22. Therefore, since air is sufficiently guided to the cruise rotors 22, sufficient thrust can be generated by the cruise rotors 22.

In the aspect of the present invention, the rear portion 12r of the fuselage 12 may extend to the position below the two cruise rotors 22.

According to the above configuration, air flowing from the front can be guided to the cruise rotors 22. Therefore, thrust can be efficiently generated.

In the aspect of the present invention, the rear portion 12r of the fuselage 12 may have a cross section that is parallel to the left-right direction and the up-down direction, and the area of the cross section may gradually decrease from the front toward the rear.

According to the above configuration, the shape of the fuselage 12 enables air flowing from the front to be guided to the cruise rotors 22. Therefore, thrust can be efficiently generated.

In the aspect of the present invention, the two cruise rotors 22 may be connected to the wing (the rear wing 16), at least a portion of the wing and at least a portion of each of the two cruise rotors 22 may overlap each other in the front view of the aircraft 10, and the center of each of the cruise rotors 22 may be located below the wing.

According to the above configuration, since the portion of the cruise rotor 22 that protrudes above the wing (the rear wing 16) is smaller than the portion of the cruise rotor 22 that protrudes below the wing, it is possible to reduce the resistance force generated in the cruise rotor 22.

In the aspect of the present invention, the two cruise rotors 22 may each include the propeller 52 and the duct 54 configured to surround the propeller 52, and the ducts 54 of the two cruise rotors 22 may be connected to each other.

According to the above configuration, since one of the cruise rotors 22 is connected to the wing (the rear wing 16) and the other of the cruise rotors 22, the rigidity of the cruise rotors 22 and the wing is increased.

In the aspect of the present invention, the aircraft may include the plurality of takeoff and landing rotors 20 configured to generate lift, and at least some takeoff and landing rotors (the takeoff and landing rotors 20d) among the plurality of takeoff and landing rotors 20 may be disposed rearward of the at least two cruise rotors 22.

According to the above configuration, the flow of air generated by the takeoff and landing rotors 20d disposed rearward of the cruise rotors 22 does not interfere with the flow of air guided to the cruise rotors 22. Therefore, the thrust generated by the cruise rotors 22 is not adversely affected.

In the aspect of the present invention, the wing (the rear wing 16) may include the flight control surface (the elevon 36) disposed on each of the right wing and the left wing thereof, and the two cruise rotors 22 may be arranged closer to the fuselage 12 than the flight control surface disposed on the right wing and the flight control surface disposed on the left wing are.

The aircraft according to the present invention is not limited to the above disclosure, and various configurations could be adopted therein without departing from the essence and gist of the present invention.

The invention claimed is:

1. An aircraft comprising:
   a fuselage;
   a wing connected to an upper portion of a rear portion of the fuselage; and
   at least two cruise rotors disposed on right and left sides of a central axis of the fuselage, and configured to generate thrust when the aircraft moves in a horizontal direction,
   wherein two cruise rotors among the at least two cruise rotors are supported by the wing at positions rearward of the wing,
   at least a portion of the wing and at least a portion of each of the two cruise rotors overlap each other in a front view of the aircraft,
   the two cruise rotors are disposed immediately behind the wing,
   at least a portion of the fuselage and at least a portion of each of the two cruise rotors overlap each other in a front view of the aircraft to form an overlapping portion, and
   the rear portion of the fuselage includes an inclined surface that is inclined downward in a direction from front to rear, in a manner so that an area of the overlapping portion gradually decreases from the front toward the rear.

2. The aircraft according to claim 1, wherein the rear portion of the fuselage has a cross section that is parallel to a left-right direction and an up-down direction, and an area of the cross section gradually decreases from the front toward the rear.

3. The aircraft according to claim 1, wherein the two cruise rotors each include a propeller, and a duct configured to surround the propeller, and the ducts of the two cruise rotors are connected to each other.

4. The aircraft according to claim 1, further comprising a plurality of takeoff and landing rotors configured to generate lift, wherein
   at least some takeoff and landing rotors among the plurality of takeoff and landing rotors are disposed rearward of the at least two cruise rotors.

5. An aircraft comprising:
   a fuselage;
   a wing connected to an upper portion of a rear portion of the fuselage; and
   at least two cruise rotors disposed on right and left sides of a central axis of the fuselage, and configured to generate thrust when the aircraft moves in a horizontal direction,
   wherein two cruise rotors among the at least two cruise rotors are connected to the wing at positions rearward of the wing,
   at least a portion of the fuselage and at least a portion of each of the two cruise rotors overlap each other in a front view of the aircraft to form an overlapping portion,
   the rear portion of the fuselage includes an inclined surface that is inclined downward in a direction from front to rear, in a manner so that an area of the overlapping portion gradually decreases from the front toward the rear, and the rear portion of the fuselage extends to a position below the two cruise rotors.

6. The aircraft according to claim 5, wherein the two cruise rotors each include a propeller, and a duct configured to surround the propeller, and the ducts of the two cruise rotors are connected to each other.

7. The aircraft according to claim 5, further comprising a plurality of takeoff and landing rotors configured to generate lift, wherein at least some takeoff and landing rotors among the plurality of takeoff and landing rotors are disposed rearward of the at least two cruise rotors.

8. An aircraft comprising:

a fuselage;

a wing connected to an upper portion of a rear portion of the fuselage; and at least two cruise rotors disposed on right and left sides of a central axis of the fuselage, and configured to generate thrust when the aircraft moves in a horizontal direction, wherein two cruise rotors among the at least two cruise rotors are connected to the wing at positions rearward of the wing, at least a portion of the fuselage and at least a portion of each of the two cruise rotors overlap each other in a front view of the aircraft to form an overlapping portion, the rear portion of the fuselage includes an inclined surface that is inclined downward in a direction from front to rear, in a manner so that an area of the overlapping portion gradually decreases from the front toward the rear, at least a portion of the wing and at least a portion of each of the two cruise rotors overlap each other in the front view of the aircraft, and a center of each of the cruise rotors is located below the wing.

* * * * *